United States Patent
Goren et al.

(10) Patent No.: US 8,056,809 B2
(45) Date of Patent: Nov. 15, 2011

(54) IMAGE ENHANCEMENT IN IMAGING SYSTEM

(75) Inventors: David P. Goren, Smithtown, NY (US); Edward Barkan, Miller Place, NY (US); Igor Vinogradov, Bay Shore, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 571 days.

(21) Appl. No.: 11/729,745

(22) Filed: Mar. 29, 2007

(65) Prior Publication Data
US 2008/0237351 A1  Oct. 2, 2008

(51) Int. Cl.
*G06K 7/10* (2006.01)
(52) U.S. Cl. ............... 235/462.24; 235/462.25
(58) Field of Classification Search ........ 235/462.01–462.45, 472.01, 472.02, 235/472.03, 454, 470
See application file for complete search history.

(56) References Cited

U.S. PATENT DOCUMENTS

| | | | | |
|---|---|---|---|---|
| 5,534,684 A * | 7/1996 | Danielson | ............... | 235/472.02 |
| 5,600,121 A * | 2/1997 | Kahn et al. | ............... | 235/462.48 |
| 5,736,725 A * | 4/1998 | Danielson | ............... | 235/462.11 |
| 5,821,518 A * | 10/1998 | Sussmeier et al. | ....... | 235/462.01 |
| 6,164,545 A | 12/2000 | Danielson | | |
| 7,375,630 B2 * | 5/2008 | Babich et al. | ............... | 340/567 |
| 2002/0148900 A1 * | 10/2002 | Gurevich et al. | ......... | 235/462.34 |
| 2004/0118919 A1 | 6/2004 | Breytman et al. | | |
| 2004/0136069 A1 | 7/2004 | Li et al. | | |
| 2005/0218231 A1 * | 10/2005 | Massieu | ............... | 235/472.01 |
| 2006/0132639 A1 | 6/2006 | Page | | |
| 2007/0176765 A1 * | 8/2007 | Babich et al. | ............... | 340/522 |
| 2008/0105745 A1 * | 5/2008 | Lei | ............... | 235/462.1 |
| 2008/0105746 A1 * | 5/2008 | Lei | ............... | 235/462.11 |

FOREIGN PATENT DOCUMENTS

| | | |
|---|---|---|
| EP | 1 720 113 A2 | 11/2006 |
| WO | 2004/063989 A2 | 7/2004 |

OTHER PUBLICATIONS

International Search Report and the Written Opinion of the Intentional Searching Authority for PCT/US2008/056397 dated Jul. 28, 2008.
Office Action dated Jan. 18, 2010 in related European Patent application 0874375612-2210.

* cited by examiner

*Primary Examiner* — Thien M Le
(74) *Attorney, Agent, or Firm* — Nong-Qiang Fan

(57) ABSTRACT

Image enhancement of symbol targets and non-symbol targets is performed based on the distance to the target, and optionally on the type of target being imaged, by an imaging system to improve reader performance. An axicon and other lenses are preferred to capture light from the target.

23 Claims, 3 Drawing Sheets

IMAGE ENHANCEMENT IN IMAGING SYSTEM

DESCRIPTION OF THE RELATED ART

Solid-state imaging systems have been used to electro-optically read targets, such as one-dimensional bar code symbols, particularly of the Universal Product Code (UPC) type, each having a row of bars and spaces spaced apart along one direction, and two-dimensional symbols, such as Code 39, which introduced the concept of vertically stacking a plurality of rows of bar and space patterns in a single symbol. The structure of Code 39 is described in U.S. Pat. No. 4,794,239. Another two-dimensional code structure for increasing the amount of data that can be represented or stored on a given amount of surface area is known as PDF417 and is described in U.S. Pat. No. 5,304,786.

These solid-state imaging systems have also been used to capture images or pictures of a non-symbol target and include an imager having a one- or two-dimensional array of cells or photosensors, which correspond to image elements or pixels in a field of view of the imager. Such an imager may include a one- or two-dimensional charge coupled device (CCD) or a complementary metal oxide semiconductor (CMOS) device and associated circuits for producing electronic signals corresponding to a one- or two-dimensional array of pixel information over the field of view.

It is therefore known to use a solid-state imaging system for capturing a monochrome image of a symbol as, for example, disclosed in U.S. Pat. No. 5,703,349. It is also known to use a solid-state imaging system with multiple buried channels for capturing a full color image of the target as, for example, disclosed in U.S. Pat. No. 4,613,895. It is common to provide a two-dimensional CCD with a 640×480 resolution commonly found in VGA monitors, although other resolution sizes are possible.

The design of a high performance imaging system for capturing the image of a target symbol and decoding the symbol, as well as capturing the image of a non-symbol target, presents many challenges. Symbols are generally located relatively close to the imager, whereas non-symbol targets whose pictures are to be taken are generally located relatively further away from the imager. Optimal performance can be achieved using auto-focus/zoom optical systems to focus at the different distances from the imager; however, these optical systems are relatively slow and use moving parts requiring very high-accuracy motion. Although these optical systems are fast enough for taking a picture of a non-symbol target, the capture and decoding of symbol targets requires much faster performance. Reliability is much more important for the capture and decoding of symbol targets because the imaging system will scan many more symbol targets over its working lifetime as compared to an imaging system that takes pictures of non-symbol targets. In addition, the conventional optical systems used in imaging systems for taking pictures of non-symbol targets will not survive in an industrial environment where dropping and rough use is common.

SUMMARY OF THE INVENTION

One feature of the present invention resides, briefly stated, in an imaging system for, and a method of, acquiring images of symbol targets and non-symbol targets located at variable distances from the system. The system includes a solid-state imager having an array of image sensors for capturing light from the targets over a field of view. Preferably, the array is a CCD or a CMOS array. The system further includes a rangefinder for determining the distance to a target; and an image enhancer, preferably software, for enhancing the image of the target based on the distance determined by the rangefinder. System performance and reliability are increased due to the use of no or few moving parts.

Another feature of the present invention is embodied in providing means for determining a type of the target by distinguishing between the symbol targets and the non-symbol targets. The image enhancer is further operative for enhancing the image of the target based on the target type. This further improves system performance and reliability.

In the preferred embodiment, the system includes a housing having a window; and an illuminator in the housing for illuminating the targets with illumination light directed from an illuminating light source to and through the window. The illuminating light source preferably includes a plurality of light emitting diodes (LEDs).

The rangefinder may be part of the imager, or may be independent of the imager. The image enhancer includes a plurality of filters, one of the filters being selected based on the distance determined by the rangefinder. Also, the imager preferably includes an imaging lens, such as an axicon, as well as other lenses, for focusing the light from the targets onto the image sensors.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
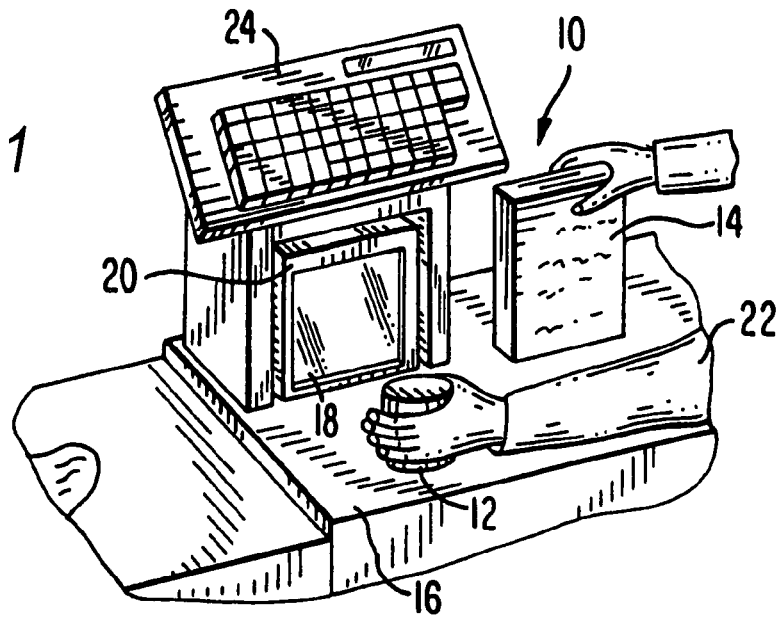
FIG. 1 is a perspective view of a portable imaging system operative for capturing light from targets.

Reference numeral 10 in FIG. 1 generally identifies a workstation for processing transactions and specifically a checkout counter at a retail site at which products, such as a can 12 or a box 14, each bearing a target symbol, are processed for purchase. The counter includes a countertop 16 across which the products are slid at a swipe speed past a generally vertical planar window 18 of a portable, box-shaped, vertical slot reader or imaging system 20 mounted on the countertop 16. A checkout clerk or operator 22 is located at one side of the countertop, and the imaging system 20 is located at the opposite side. A host or cash/credit register 24 is located within easy reach of the operator. The operator 22 can also hold the imaging system 20 in one's hand during imaging.

Figure 2:
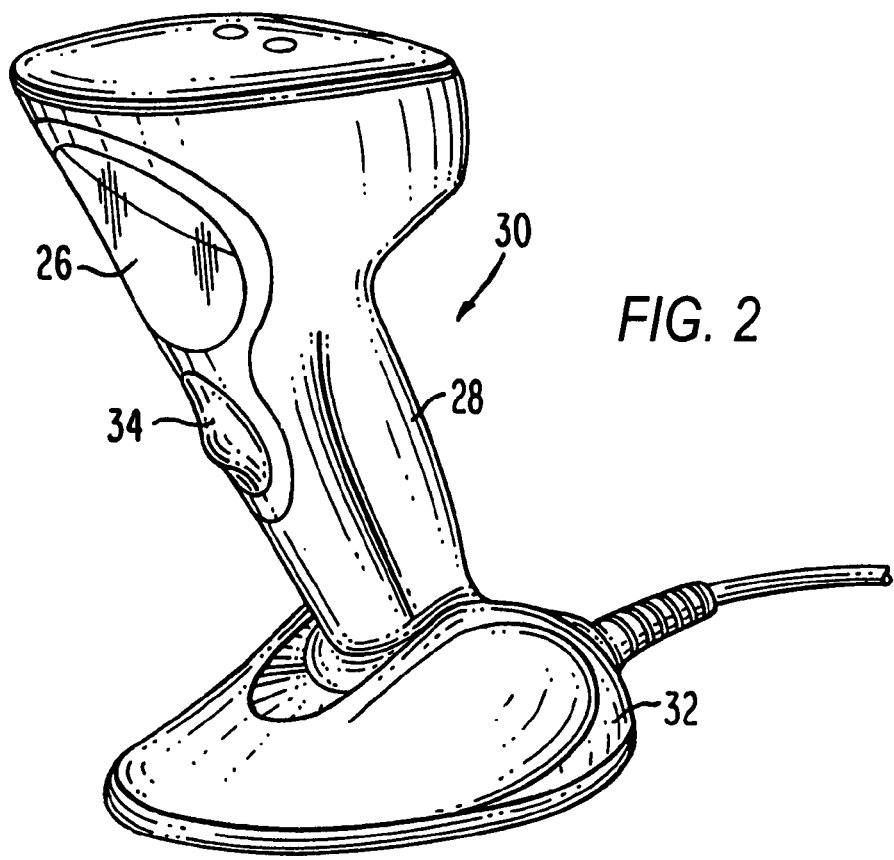
FIG. 2 is a perspective view of another portable imaging system operative in either a hand-held mode, or a workstation mode, for capturing light from targets.

Reference numeral 30 in FIG. 2 generally identifies another imaging system having a different configuration from that of imaging system 20. Imaging system 30 also has a generally vertical window 26 and a gun-shaped housing 28 supported by a base 32 for supporting the imaging system 30 on a countertop. The imaging system 30 can thus be used as a stationary workstation in which products are slid or swiped past the vertical window 26, or can be picked up off the countertop and held in the operator's hand and used as a handheld imaging system in which a trigger 34 is manually depressed to initiate imaging of a target. In another variation, the base 32 can be omitted.

Figure 3:
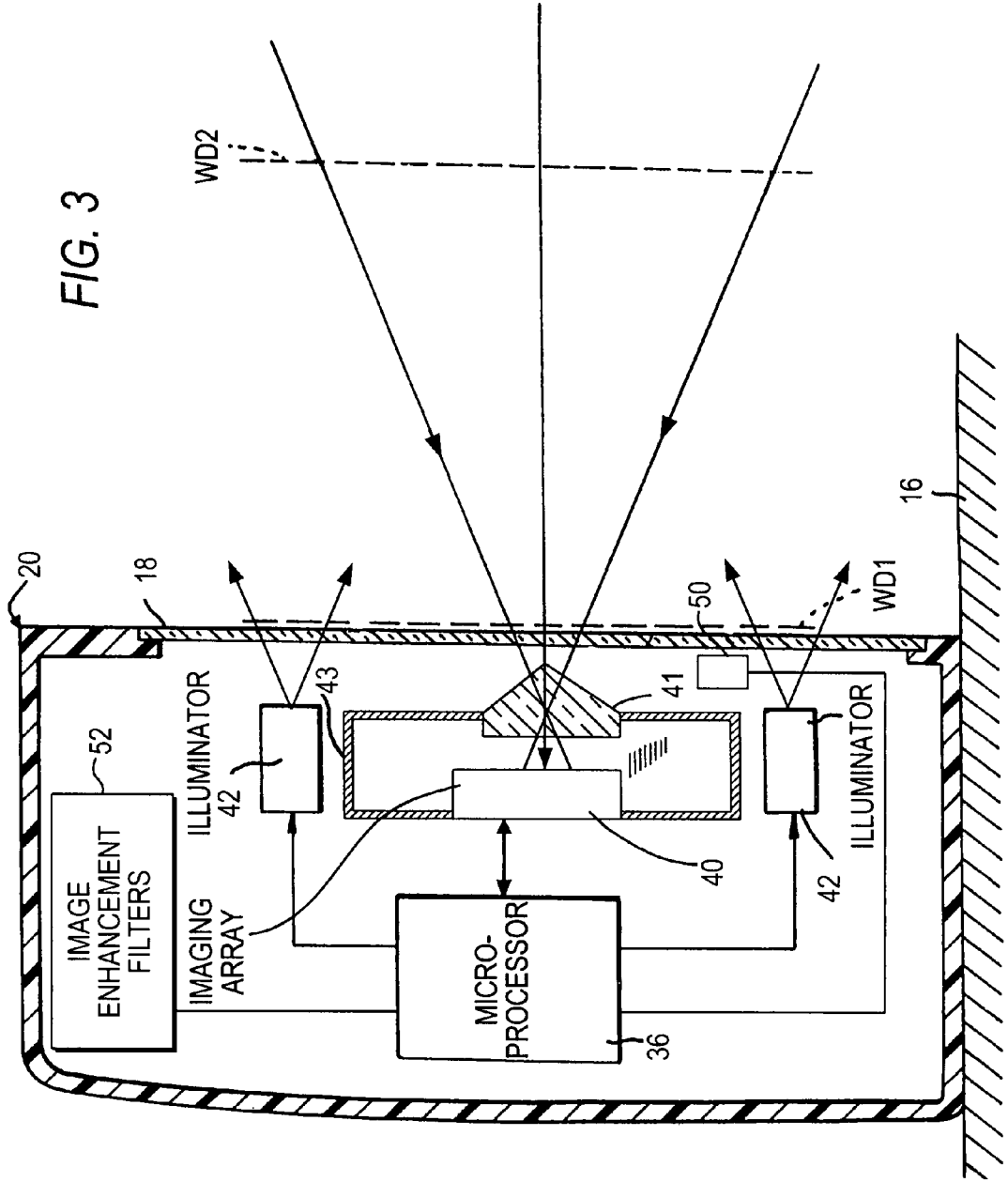
FIG. 3 is a schematic diagram of various components of the system of FIG. 1.

As schematically shown in FIG. 3, an imager 40 and a focusing lens 41, preferably an axicon, as well as other lenses, are mounted in an enclosure 43 in either imaging system, such as the imaging system 20. The imager 40 is a solid-state device, for example, a CCD or a CMOS imager and has a one- or two-dimensional array of addressable image sensors operative for capturing light through the window 18 from a target, for example, a one- or two-dimensional symbol, or a non-symbol target, over a field of view. The non-symbol target can be virtually anything, such as a person, place, or thing whose picture is to be acquired. The targets are located anywhere in a working range of distances between a close-in working distance (WD1) and a far-out working distance (WD2). In a preferred embodiment, WD1 is about two inches from the imager array 40 and generally coincides with the window 18, and WD2 is about eight inches from the window 18. Typically, a symbol target is located relatively close to the window, whereas a non-symbol target is located relatively further away from the window. Of course, symbol targets can also be located relatively further away from the window, especially when the axicon is used. As described above, these different distances compromise the capability of the imaging system to rapidly acquire both non-symbol targets and symbol targets.

An illuminator is also mounted in the imaging system and preferably includes a plurality of light sources, e.g., light emitting diodes (LEDs) 42, arranged to uniformly illuminate the target. As shown in FIG. 3, the imager 40 and the illuminator LEDs 42 are operatively connected to a controller or microprocessor 36 operative for controlling the operation of these components. Preferably, the microprocessor is the same as the one used for decoding light scattered from the target symbols and for processing the captured target images.

In operation, the microprocessor 36 sends a command signal to pulse the illuminator LEDs 42 for a short time period, say 500 microseconds or less, and energizes the imager 40 to collect light from a target only during said time period. A typical array needs about 33 milliseconds to acquire the entire target image and operates at a frame rate of about 30 frames per second. The array may have on the order of one million addressable image sensors. Frequently, the illuminator LEDs 42 are pulsed for a few milliseconds, especially when working at extended ranges where it is difficult to illuminate the symbol target as brightly. Under these circumstances, the illumination may be activated for up to around 30 ms.

In accordance with this invention, as best seen in FIG. 3, a rangefinder 50 is mounted in the imaging system and is connected to the microprocessor 36. The rangefinder 50 is operative for determining the distance (between WD1 and WD2) to a target; and an image enhancer 52, preferably software, is associated with the microprocessor 36 and is operative for enhancing the image of the target based on the distance determined by the rangefinder. System performance and reliability are increased due to the use of no or few moving parts.

The rangefinder 50 can be a separate measuring system independent from the imager 40, e.g., infrared, ultrasonic, etc., or a system that uses the imager 40 itself as part of the distance measuring system, for example, the parallax of an aiming spot can be used to estimate distance. The distance measurement can also be estimated from the image itself by analyzing what is known to be, or expected to be, sharp edges. The distance measurement can be a simple "near or far" reading, or can be more accurate by defining a number of zones.

The distance to the target can be mapped to a known optical point spread function (PSF) which mathematically describes the distortions introduced by the optical system. The PSF can be used to implement an appropriate enhancement filter of the enhancer 52. An example of such an enhancement filter that uses knowledge of the PSF is the well-known Wiener deconvolution filter. A number of enhancement filters as a function of distance can be stored in the memory of the microprocessor to be used at the appropriate time.

Another feature of the present invention is embodied in providing means for determining a type of the target by distinguishing between the symbol targets and the non-symbol targets. Preferably, the microprocessor itself serves to distinguish between symbol targets and non-symbol targets. The image enhancer is further operative for enhancing the image of the target based on the target type.

Knowledge of the target type (i.e., symbol decoding or picture taking) and the distance from the target being imaged can be used to design optimal and efficient image enhancement algorithms. There are different performance criteria required for reading symbols versus taking pictures. Images of symbols can typically withstand substantial distortion and blur and still be properly decoded and therefore need less enhancement. In addition, the processing of a symbol image must be fast and efficient so as to not negatively impact the decode time. On the other hand, picture images are expected to be sharp and the processing of pictures is typically not as time critical as decoding symbols. An extreme example would be to perform no image enhancement on the symbol images, while performing extensive enhancement on non-symbol images containing pictures to be viewed by a user. This further improves system performance and reliability.

An alternate design using little or no moving parts to increase product reliability uses a single fixed lens design or an optical arrangement using minimal movement (e.g., two lens positions or aperture positions) is desired. One such lens design that maximizes performance is the axicon imaging lens 41.

Figure 4:
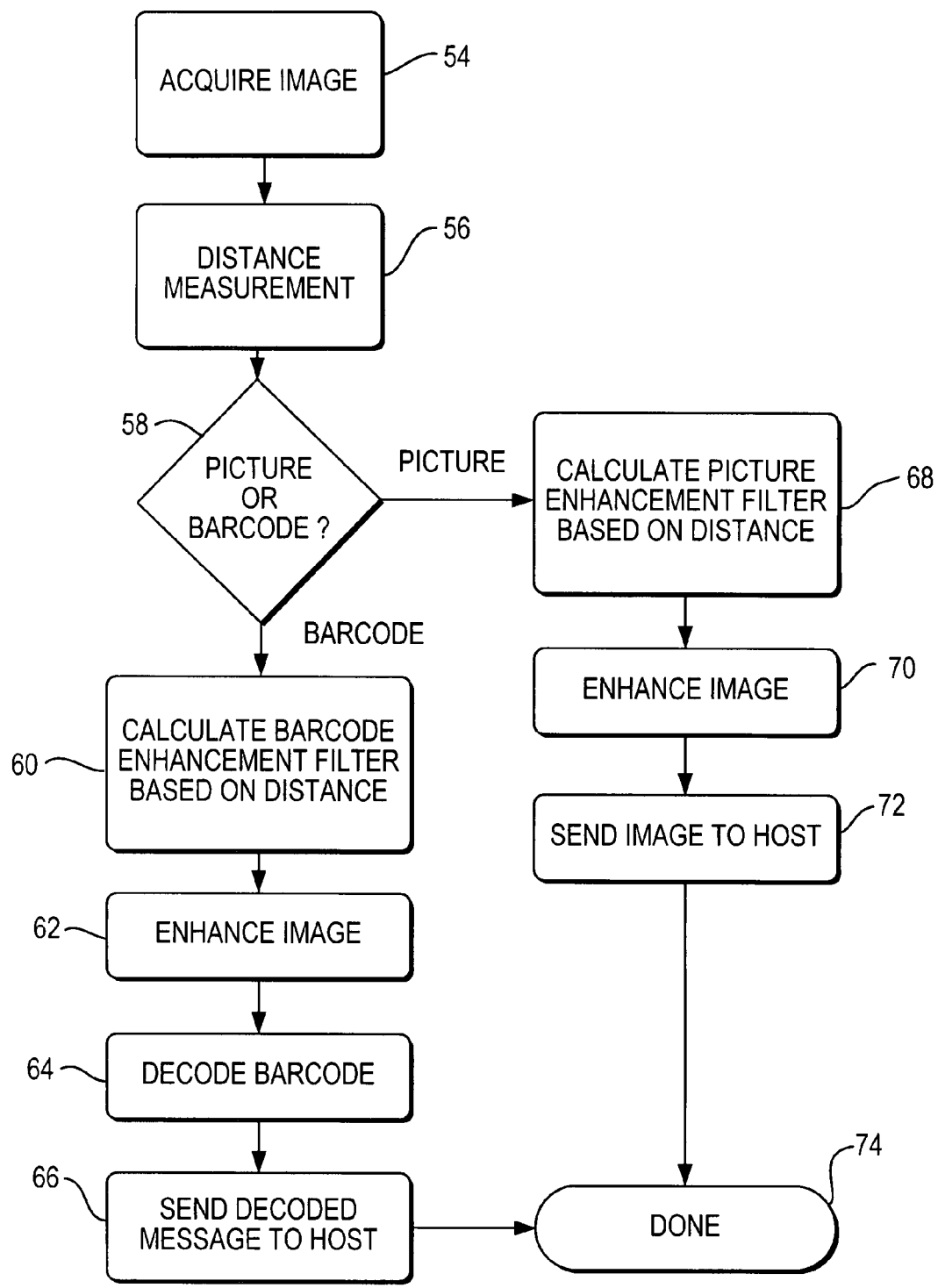
FIG. 4 is a flow chart depicting the operation of the system of FIG. 3.

A flowchart illustrating the described system and method is shown in FIG. 4. After an image is acquired 54 and a distance measurement 56 is made, the appropriate enhancement filter 60, 68 and post processing 62, 64, 66; 70, 72 is applied depending on the target type 58 and the target distance 56. The decoded symbol or the picture image is sent 70 to the host 24. The image enhancer and the post processing functions are software functions that are carried out in the microprocessor 36.

It will be understood that each of the elements described above, or two or more together, also may find a useful application in other types of constructions differing from the types described above. Thus, imaging systems having different configurations can be used. In the preferred embodiment, the imaging systems are mounted in handheld housings.

While the invention has been illustrated and described as image enhancement in an imaging reader, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An imaging system for acquiring images of symbol targets and non-symbol targets located at variable distances from the system, comprising:
    a solid-state imager having an array of image sensors for capturing light from the targets over a field of view;
    a rangefinder for determining the distance to a target; and
    an image enhancer for enhancing the image of the target based on the distance determined by the rangefinder, wherein the image enhancer includes an enhancement filter calculated based on the distance determined by the rangefinder, wherein the enhancement filter is a filter operating on pixels of the image of the target captured by the array of image sensors.

2. The system of claim 1, and means for determining a type of the target by distinguishing between the symbol targets and the non-symbol targets, and wherein the image enhancer is further operative for enhancing the image of the target based on the target type.

3. The system of claim 1, and a housing having a window; and an illuminator in the housing for illuminating the targets with illumination light directed from an illuminating light source to and through the window.

4. The system of claim 3, wherein the illuminating light source includes a plurality of light emitting diodes (LEDs).

5. The system of claim 1, wherein the rangefinder is part of the imager.

6. The system of claim 1, wherein the rangefinder is independent of the imager.

7. The system of claim 1, wherein the image enhancer includes a plurality of filters, one of the filters being selected based on the distance determined by the rangefinder.

8. The system of claim 1, wherein the imager includes an imaging lens for focusing the light from the targets onto the image sensors.

9. The system of claim 8, wherein the imaging lens is an axicon.

10. The system of claim 1, wherein the enhancement filter is a Wiener deconvolution filter.

11. An imaging system for acquiring images of symbol targets and non-symbol targets located at variable distances from the system, comprising:
    means having an array of image sensors for capturing light from the targets over a field of view;
    means for determining the distance to a target; and
    means for enhancing the image of the target based on the distance determined by the determining means, wherein the means for enhancing the image includes an enhancement filter calculated based on the distance determined by the rangefinder, wherein the enhancement filter is a filter operating on pixels of the image of the target captured by the array of image sensors.

12. The system of claim 11, and means for determining a type of the target by distinguishing between the symbol targets and the non-symbol targets, and wherein the enhancing means is further operative for enhancing the image of the target based on the target type.

13. A method of acquiring images of symbol targets and non-symbol targets located at variable distances, comprising the steps of:
    capturing light from the targets over a field of view with a solidstate imager having an array of image sensors;
    determining the distance to a target;
    calculating an enhancement filter in a memory of a microprocessor based on the distance determined by the rangefinder; and
    enhancing the image of the target with the enhancement, wherein the enhancement filter is a filter operating on pixels of the image of the target captured by the array of image sensors.

14. The method of claim 13, and the step of determining a type of the target by distinguishing between the symbol targets and the non-symbol targets, and wherein the enhancing step is further performed by enhancing the image of the target based on the target type.

15. The method of claim 13, and the step of illuminating the targets with illumination light directed from an illuminating light source to and through a window.

16. The method of claim 15, and the step of constituting the illuminating light source with a plurality of light emitting diodes (LEDs).

17. The method of claim 13, wherein the determining step is performed by the imager.

18. The method of claim 13, wherein the determining step is performed independently of the imager.

19. The method of claim 13, wherein the enhancing step is performed by selecting one of a plurality of filters based on the distance determined.

20. The method of claim 13, and the step of focusing the light from the targets onto the image sensors with an imaging lens.

21. The method of claim 20, and constituting the imaging lens as an axicon.

22. The method of claim 13, wherein the enhancement filter is a Wiener deconvolution filter.

23. An imaging system for acquiring images of symbol targets and non-symbol targets located at variable distances from the system, comprising:
    a solid-state imager having an array of image sensors for capturing light from the targets over a field of view;
    an axicon for focusing the captured light from the targets onto the imager; and
    an image enhancer for enhancing the image of a target based on the captured light focused by the axicon, wherein the image enhancer includes an enhancement filter calculated based on the distance determined by the rangefinder, wherein the enhancement filter is a filter operating on pixels of the image of the target captured by the array of image sensors.

* * * * *